March 8, 1960     H. J. REVOIR     2,927,868
PRESSURE-SENSITIVE ADHESIVE TAPE
Filed Jan. 15, 1958
INVENTOR
HAROLD J. REVOIR
BY
Carpenter, Abbott, Coulter & Kinney
ATTORNEYS : 2,927,868
Patented Mar. 8, 1960

2,927,868
PRESSURE-SENSITIVE ADHESIVE TAPE

Harold J. Revoir, St. Paul, Minn., assignor to Minnesota Mining and Manufacturing Company, St. Paul, Minn., a corporation of Delaware Application January 15, 1958, Serial No. 708,998

1 Claim. (Cl. 117—76)

This invention relates to pressure-sensitive adhesive tape of a well-known type having a non-fibrous cellulose acetate film backing coated with a water-insoluble rubbery-base pressure-sensitive adhesive (which is normally and aggressively tacky). In my improved product the film backing is primed prior to coating with the adhesive so as to provide an interposed primer coating of extreme thinness which unites the adhesive to the backing film much more tightly than would be the case in the absence of the primer. The novel feature of the present invention resides in the employment of a novel primer having unexpected utility in this connection.

The primer is employed to assure retention of the integrity of the tape when unwound from the roll and when removed from smooth surfaces (such as glass or metal) to which temporarily applied, avoiding delamination which might otherwise occur under severe or unusual conditions of use. The aggressively tacky adhesive adheres to the surface from which the tape is being removed, and this results in a force tending to delaminate the adhesive from its backing.

The U.S. patent of R. G. Drew, No. 2,328,066 (August 31, 1943), disclosed a type of primer for usage on cellophane and other hydrophilic films, which has been extensively employed. His patent taught priming of hydrophilic cellulosic films (such as cellopane) by the application of an aqueous emulsion of a hydrophilic colloidal agglutinant (such as casein) and a latex of natural or synthetic rubber which is compatible with the subsequently applied adhesive coating; and he showed that the cellulosic film thus coated with the aqueous primer solution could be flash-dried so as to avoid warping and wrinkling.

Drew's casein-latex type of primer does not lend itself to use on cellulose acetate backing films having a hydrophobic (water-repellent) surface, as distinguished from the hydrophilic (water-attractive) surface of cellophane. Commercial cellulose acetate films employed in tape manufacture are formed from a plasticized di-acetate ester of cellulose, with di-ethyl phthalate being commonly used as the plasticizer; such water-insoluble and hydrophobic plasticizers thus being opposite in nature to the water-soluble humectant plasticizers such as glycerine or polyethylene glycol which are commonly used for cellophane. Consequently, the cellulose acetate backing films are resistant to changes resulting from exposure to either low or high humidities. They are highly transparent and completely "water-white," resulting in the production of a highly attractive lustrous and transparent tape. A suitable illustrative film is marketed by the Celanese Corporation of America under the designation "P–904."

Various attempts have been made to secure good adhesive anchorage to cellulose acetate backings. One method is to hydrolyze the surface by washing it with sodium hydroxide, thereby destroying the ester linkage, and essentially rendering the surface hydrophilic. Subsequent to this operation, the above-mentioned casein-latex primer can be employed. However, such treatments which introduce an extra processing step are costly, and not generally employed.

An alternative which has been tried is the roughening of the surface to which the adhesive is to be anchored. This, too, has the objection of introducing an extra processing step, which is also very expensive.

Heretofore no satisfactory primer has been known for directly priming the unmodified, smooth, lustrous, hydrophobic surface of cellulose acetate films in the manufacture of pressure-sensitive adhesive tapes, so far as I am aware.

I have discovered, surprisingly, that excellent priming action can be obtained by applying to the smooth, lustrous, hydrophobic surface of an unmodified cellulose acetate film, a thin coating of an aqueous emulsion of rubber latex (natural or synthetic), casein, and polyvinylpyrrolidone; followed by drying to evaporate off the water and deposit a dried primer film that is firmly anchored to the cellulose acetate film surface. Conventional water-insoluble rubbery-base pressure-sensitive adhesive coatings applied thereto are firmly anchored to the primer film and are thereby firmly bonded to the cellulose acetate film backing.

The accompanying diagrammatic edge-view drawing illustrates the resultant adhesive tape product.

This result was surprising because the primer coating composition is applied to the hydrophobic cellulose acetate surface as an aqueous emulsion and both the casein and the polyvinylpyrrolidone (which may be referred to as "PVP") are hydrophilic colloidal agglutinants. When either one is employed alone (in combination with the rubber latex), effective priming action is not obtained, as is to be expected. Yet the combination of both of these materials with the rubber latex results in excellent priming. I am unable to explain this seemingly paradoxical result.

Best results are obtained when the proportions by weight are within the ranges of about 5 to 20 parts of casein and 20 to 90 parts of PVP, per 100 parts of rubber; all on a dry solids basis.

PVP is a water-soluble polymer of vinylpyrrolidone which in dry form is a white amorphous powder. A commercially available example found highly suitable for present usage is known as "PVP Type NP K–30," having an average molecular weight of about 40,000; supplied by General Aniline and Film Corp. Grades of even higher molecular weight can be used, such as those designated as "K–60" and "K–90" by that company.

Example

A presently preferred primer composition for use in the manufacture of my improved pressure-sensitive cellulose acetate tape is prepared from the following ingredients, all parts being by weight.

|  | Parts |
|---|---|
| Buna S rubber (dry basis) as latex containing 40% solids | 100 |
| Polyvinylpyrrolidone (40,000 mol. wt.) | 45 |
| Casein | 10 |
| Fungicide | 0.2 |
| Ammonium hydroxide solution (28% conc.) | 5.0 |
| Water (approximately) | 435 |

Buna S rubber is a term applied to rubbery butadiene-styrene copolymers and a preferred type is GRS–2000. Such synthetic rubbers are commonly used in the production of rubber-resin pressure-sensitive tape adhesives.

The fungicide is optional and is included to avoid bacterial spoilage in the event of storage for substantial periods before use. These are well-known. A suitable one is available under the trademark "Santobrite A" from Monsanto Chemical Company.

The following compounding procedure is employed:
An aqueous dispersion of PVP is prepared by adding successive increments of the 45 parts of PVP to about 105 parts of water and agitating until dispersion is complete.

A casein solution is separately prepared in a stainless steel mixing drum. The 10 parts of casein are added to 30 parts of water, the fungicide is added, and the mixture is allowed to stand about one hour to soften the casein. Then 5 parts of the 28% ammonium hydroxide solution is added, followed by 50 parts of hot water (at about 80° C.), and the mixture is thoroughly agitated to form a smooth dispersion of ammonium caseinate.

The casein solution is added to 250 parts of aqueous rubber latex (100 parts rubber solids) with agitation and thoroughly mixed at a temperature kept under 40° C. The pH value is adjusted to 10-11 with ammonium hydroxide as required. The PVP solution is slowly added with agitation to produce a smooth emulsion; then 250 parts of additional water are incorporated to adjust the solids to a desired 20-21%. The mixture is filtered through cheesecloth and is stored in polyethylene-lined drums. It is not necessary to use the finish primer at 20% solids, and they may be above or below this specified quantity.

In manufacturing adhesive tape the cellulose acetate backing film is coated with the primer emulsion in a wet coating weight of about 8.5 pounds per 1000 square yards, resulting in a dry coating weight of about 1.1 pounds per 1000 square yards. The coated film is dried by passing around steam-heated drums so as to dry the primer while the web is under tension, thereby preventing wrinkling and warping of the dried primed film. The procedures described in the aforesaid Drew Patent No. 2,328,066 can be employed. The film backing may be provided on the back (unprimed) surface with a low adhesion back-size coating which serves to reduce the force required to unwind the adhesive tape from the roll (cf., U.S. Patents No. 2,532,011, issued November 28, 1950, and No. 2,607,711, issued August 19, 1952). The primed surface of the film web is coated with a solution or emulsion of a pressure-sensitive adhesive (such as one compounded of a butadiene-styrene rubbery polymer, or natural rubber, or a mixture, and a tackifying resin) and, after drying, the adhesive sheeting is slit and wound into tape rolls of desired size.

I claim:

A pressure-sensitive adhesive tape comprising a cellulose acetate backing film having a smooth lustrous hydrophobic surface to which a water-insoluble rubbery-base pressure-sensitive adhesive coating is firmly bonded by an interposed primer film anchored to said cellulose acetate surface; said primer film being the dried deposition product of an aqueous emulsion of a mixture of latex rubber, casein and polyvinylpyrrolidone, in proportions by weight within the ranges of about 5 to 20 parts of casein and 20 to 90 parts of polyvinylpyrrolidone per 100 parts of rubber, on a dry solids basis.

References Cited in the file of this patent

UNITED STATES PATENTS

| | | |
|---|---|---|
| 2,328,057 | Coulter | Aug. 31, 1943 |
| 2,328,066 | Drew | Aug. 31, 1943 |

OTHER REFERENCES

Schildknecht: "Vinyl and Related Polymers," John Wiley and Sons, Inc., New York, 1952, page 678, lines 5-11.